(12) United States Patent
Katikaneni et al.

(10) Patent No.: US 7,381,487 B2
(45) Date of Patent: Jun. 3, 2008

(54) IN-SITU REMOVAL OF ELECTROLYTE FROM GAS OXIDIZER

(75) Inventors: Sai P. Katikaneni, Danbury, CT (US); Mohammad Farooque, Danbury, CT (US); Glenn L. Carlson, Bethlehem, CT (US); Mark Benedict, Newtown, CT (US)

(73) Assignee: FuelCell Energy, Inc., Danbury, CT (US)

( * ) Notice: Subject to any disclaimer, the term of this patent is extended or adjusted under 35 U.S.C. 154(b) by 137 days.

(21) Appl. No.: 11/022,914

(22) Filed: Dec. 27, 2004

(65) Prior Publication Data

US 2006/0140823 A1 Jun. 29, 2006

(51) Int. Cl.
*H01M 8/00* (2006.01)
*H01M 8/04* (2006.01)

(52) U.S. Cl. .............................. 429/12; 429/13; 429/14

(58) Field of Classification Search .................. 429/12, 429/16, 46, 13, 14
See application file for complete search history.

(56) References Cited

U.S. PATENT DOCUMENTS

| | | | | |
|---|---|---|---|---|
| 3,973,993 A | * | 8/1976 | Bloomfield et al. | 429/17 |
| 5,084,363 A | * | 1/1992 | Reiser | 429/19 |
| 6,458,478 B1 | * | 10/2002 | Wang et al. | 429/17 |
| 6,521,365 B1 | * | 2/2003 | Song | 429/17 |
| 2004/0005491 A1 | | 1/2004 | Blanchet et al. | |
| 2004/0229102 A1 | * | 11/2004 | Jahnke et al. | 429/34 |

OTHER PUBLICATIONS

The Random House Dictionary1980, Jess Stein, Revised Edition, pp. 969-970.*

* cited by examiner

*Primary Examiner*—Raymond Alejandro
*Assistant Examiner*—Helen O. K. Chu
(74) *Attorney, Agent, or Firm*—Cowan, Liebowitz & Latman, P.C.

(57) ABSTRACT

A method and apparatus for use with an oxidizer assembly of a fuel cell system in which the oxidizer assembly has an oxidizing unit for oxidizing anode exhaust gas containing electrolyte particulates and is adapted or conditioned so as to enable the electrolyte particulates to be removable from the assembly and to be removed from the assembly, and wherein the conditioning and removing occur with the oxidizing unit retained in the oxidizer assembly. The fuel cell system is also adapted so that such conditioning and removing occur with the oxidizing assembly retained in the fuel cell system.

5 Claims, 8 Drawing Sheets

IN-SITU REMOVAL OF ELECTROLYTE FROM GAS OXIDIZER

BACKGROUND OF THE INVENTION

This invention relates to fuel cell systems and, in particular, to the removal of electrolyte from gas oxidizers used in such systems.

A fuel cell is a device which directly converts chemical energy stored in hydrocarbon fuel into electrical energy by means of an electrochemical reaction. Generally, a fuel cell comprises an anode and a cathode separated by an electrolyte, which serves to conduct electrically charged ions. Fuel cells operate by passing a reactant fuel gas through the anode, while passing oxidizing gas through the cathode. In order to produce a useful power level, a number of individual fuel cells are stacked in series with an electrically conductive separator plate between each cell forming a fuel cell stack.

Molten carbonate fuel cells ("MCFCs") operate by reacting oxygen in the oxidizing gas and free electrons at the cathode to form carbonate ions, which migrate across the molten carbonate electrolyte to the anode to react with hydrogen and produce water, carbon dioxide and electrical power. The electrolyte in the MCFCs comprises a molten carbonate salt mixture, which usually includes lithium carbonate, potassium carbonate, or a combination of lithium and potassium carbonates. Because the operating temperature of the MCFC is approximately 550-650° Celsius, the electrolyte is in liquid state during MCFC operation.

Typical MCFC systems include an anode exhaust gas oxidizer unit downstream from the fuel cell anode, which comprises an oxidation catalyst for oxidizing hydrogen, carbon monoxide and unreacted hydrocarbons in the anode exhaust to produce oxidizing gas suitable for adding to the air or oxidant gas for supply to the fuel cell cathode. In some cases, the oxidizer unit is incorporated into an exhaust gas oxidizer assembly which includes a mixer which precedes the oxidizer unit. In this assembly, the anode exhaust gas stream and the cathode supply air or oxidant are first mixed in the mixer and then the mixed gases are fed into the oxidizing unit for oxidizing the exhaust gas via exposure to the oxidation catalyst in the unit. The resultant gas which is rich in oxidant and carbon dioxide is then fed to the cathode of the fuel cell.

U.S. patent application Ser. No. 10/187,495, assigned to the same assignee hereof, discloses an example of such an anode exhaust gas oxidizer assembly employing a mixer/eductor and an oxidizer unit in which the gas oxidizer catalyst block of the oxidizer unit interfaces with the outlet of the mixer/eductor. In this oxidizer assembly, the gas mixture of anode exhaust gas and air enters the oxidizer catalyst block through the inlet face of the catalyst block coupled to the outlet of the mixer. In the oxidizer block, the gas mixture undergoes a combustion reaction to oxidize hydrogen, carbon monoxide and hydrocarbons present in the mixture.

During the fuel cell stack operation, some electrolyte particles are in a gas phase and are released from the electrolyte layer of the fuel cell into the anode exhaust stream. After the hot anode exhaust stream is mixed with cool air in the mixer, the temperature of the resulting gas mixture is approximately 300 to 400° Celsius. Due to the cooling of the anode exhaust, the electrolyte particles in gas phase in the exhaust stream are transformed from gaseous particles into solid electrolyte particulates. These particulates are deposited on the walls of the mixer and at the inlet face of the oxidizer catalyst block. The electrolyte particulate deposits on the inlet face of the oxidizer catalyst block create a partial obstruction of the flow path of the gas mixture into and through the oxidizer catalyst, resulting in an increased pressure drop across the catalyst block and thus an increasing difference between the pressure of the anode exhaust stream and the cathode inlet stream. In addition, the blockage by the electrolyte deposits changes the flow distribution through the catalyst block, resulting in a larger difference in temperature distribution from one end of the catalyst block to the other.

The performance and efficiency of a fuel cell stack is sensitive to pressure changes in the fuel cell assembly. Particularly, the increasing pressure difference between the anode and the cathode streams due the aforementioned accumulation of electrolyte particulate deposits on the oxidizer catalyst affects the thermal profile and voltage variations of the fuel cell stack. Moreover, electrolyte particulate deposits deactivate the oxidizer catalyst which affects the hydrocarbon combustion efficiency.

Accordingly, in order to maintain the pressure difference between the anode outlet and the cathode inlet streams constant, it is necessary to remove the electrolyte particulate deposits from the inlet face of the anode gas oxidizer catalyst. In addition, removal of electrolyte particulates reduces the deactivation of the oxidizer catalyst and improves fuel cell performance.

Conventionally, electrolyte particulates have been removed from the anode gas oxidizer catalyst by washing the oxidizer catalyst with a solvent suitable for removal of alkali carbonate compounds. This method, however, requires the fuel cell plant to be shut down and the oxidizer assembly to be disassembled to remove the catalyst block for washing. As a result, the efficiency of the fuel cell power plant declines and maintenance costs of fuel cell power plant operation significantly increase. Therefore, an in-situ method of removal of electrolyte particulates is needed so as to avoid these disadvantages.

It is therefore an object of the present invention to provide for removal of electrolyte particulates from an oxidizer assembly having an oxidizer unit of a fuel cell system which does not require the removal of the oxidizer unit from the oxidizer assembly.

It is a further object of the present invention to provide the aforesaid electrolyte particulate removal in a manner which does not significantly affect the performance of the fuel cell system.

SUMMARY OF THE INVENTION

In accordance with the principles of the present invention, the above and other objectives are realized in a method and apparatus for use with an oxidizer assembly of a fuel cell system in which the oxidizer assembly has an oxidizing unit for oxidizing anode exhaust gas containing electrolyte particulates and is adapted or conditioned so as to enable the electrolyte particulates to be removable from the assembly and to be removed from the assembly, and wherein the conditioning and removing occur with the oxidizing unit retained in the oxidizing assembly. In further accord with the invention, the fuel cell system is also adapted such that the conditioning and removing occur with the oxidizing assembly retained in the fuel cell system.

In certain of the embodiments of the invention to be disclosed hereinafter, the oxidizer assembly is adapted or conditioned to receive a solvent such that the solvent is brought in contact with the oxidizer unit for dissolving or dislodging the particulate electrolyte thereon and such that the solvent and the included particulate electrolyte are drained from the assembly. In another embodiment of the invention, the oxidizer assembly is adapted or conditioned to be heated so that particulate electrolyte flakes and is removed from the assembly by vaporization. In a further embodiment of the invention, the oxidizer assembly is conditioned or adapted to entrap the electrolyte particulates and to drain the entrapped particulates. In these embodiments, the removal of the electrolyte particulates occurs with the oxidizing unit retained in the oxidizing assembly, and, furthermore, with the fuel cell system in a state or mode which promotes and allows the removal.

In the embodiments of the invention which use a solvent, the solvents, in liquid or vapor form, are introduced into the oxidizer assembly through the mixer unit or the oxidizing unit of the assembly, are maintained in the assembly for a sufficient time to dissolve or dislodge the electrolyte particulates, and then are drained from the assembly through the mixer unit. In the embodiment of the invention in which the oxidizer assembly is heated, the heating occurs for a time sufficient to cause flaking of the electrolyte particulates and subsequent vaporization of the flaked particulates when the flaked particulates contact the mixing unit. Finally, in the embodiment of the invention in which the electrolyte particulates are entrapped, the oxidizing assembly is provided with a filter preceding the oxidizing unit for filtering the electrolyte particulates from the gas flow prior to entry into the oxidizing unit. Preferably, the filter is situated in the mixer unit and is in the form of a vane filter.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
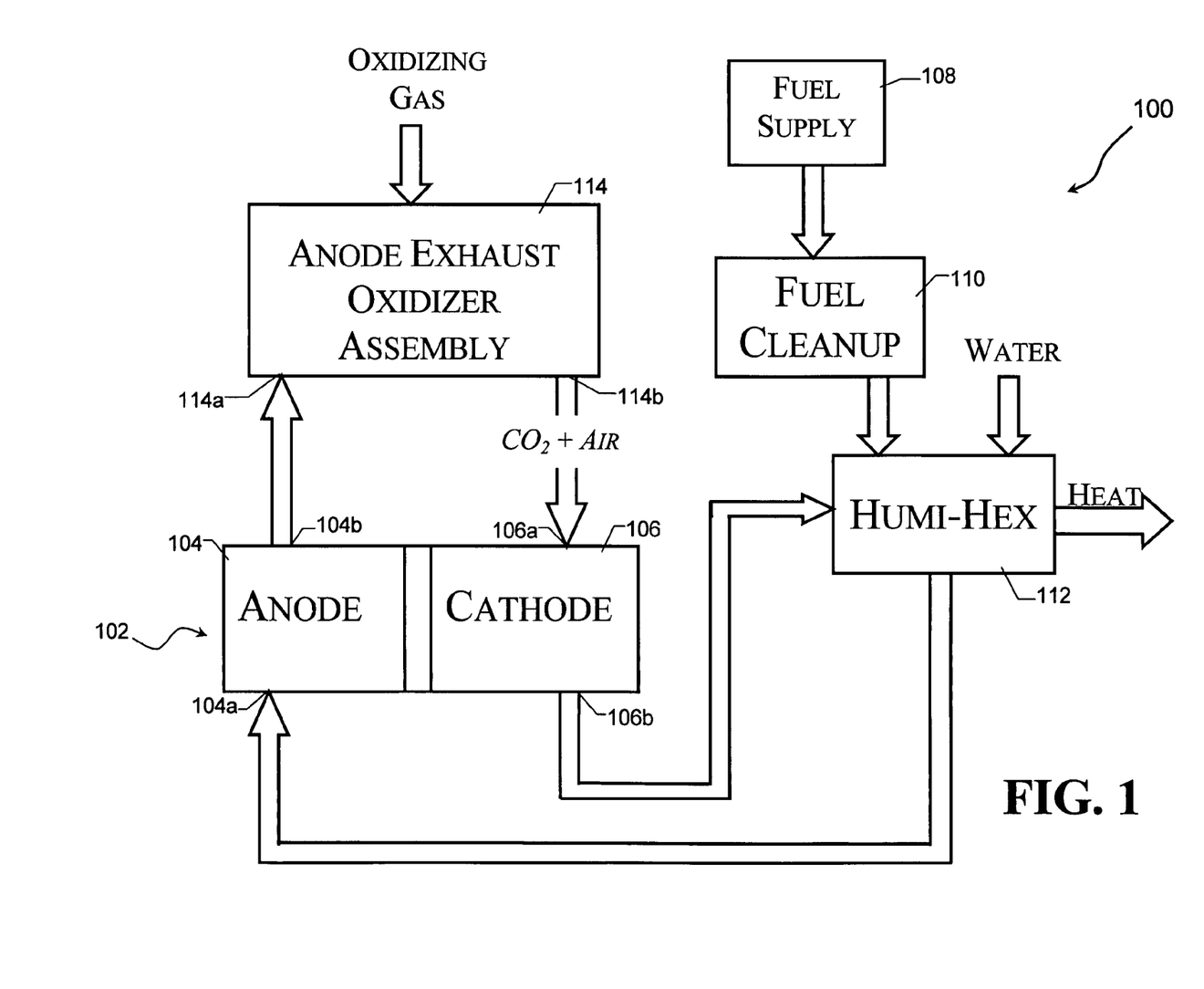
FIG. 1 shows a schematic view of a fuel cell system which is adapted to employ in-situ electrolyte removal in accordance with the principles of the present invention.

FIG. 1 shows a schematic view of a fuel cell system 100 which is adapted to perform in-situ removal of electrolyte particulates in accordance with the principles of the present invention. The fuel cell system includes a fuel cell 102 having an anode 104 and a cathode 106. Fuel gas, such as natural gas, is supplied to the system 100 from a fuel supply 108. Before being conveyed to the anode 104, the fuel undergoes fuel cleanup processing at the fuel cleanup stage 110, and is combined with water and heated in a heat exchanger 112. Processed heated fuel enters the anode through an anode inlet 104a to undergo an electrochemical reaction. Spent fuel leaves the anode 104 through an anode outlet 104b as the anode exhaust gas.

The outlet 104b of the anode 104 is coupled to an inlet 114a of an anode exhaust gas oxidizer assembly 114. In the oxidizer assembly 114, anode exhaust gas is mixed with an oxidizing gas such as air, and unreacted components including hydrogen, hydrocarbons and carbon monoxide in the anode exhaust are oxidized to produce a mixture of carbon dioxide and air. The mixture of carbon dioxide and air produced in the oxidizer assembly 114 is suitable for use as the oxidizing gas in the fuel cell cathode 106. This mixture of carbon dioxide and air enters the cathode 106 through a cathode inlet 106a. After passing through the cathode 106, spent oxidizing gas leaves the cathode 106 and is conveyed to the heat exchanger 112 for heating the fuel and water before exiting the fuel cell system 100.

Figure 2:
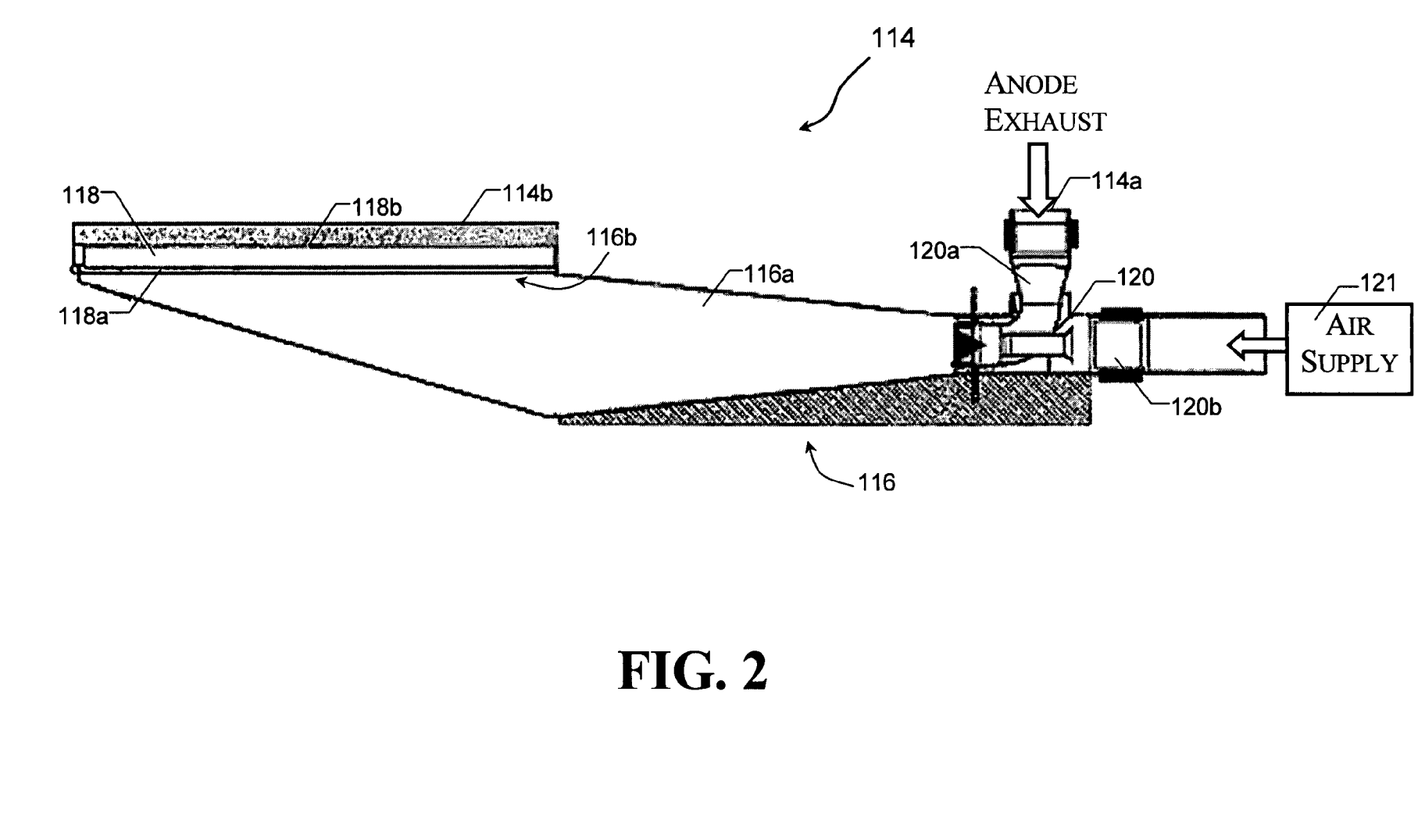
FIG. 2 shows an anode exhaust gas oxidizer assembly able to be adapted to perform in-situ electrolyte particulate removal in accordance with the present invention.

FIG. 2 shows a detailed view of an illustrative example of an anode exhaust oxidizer assembly which can be used as the assembly 114. As shown, the oxidizer assembly 114 has a mixer unit 116 and an oxidizer unit 118. The oxidizer unit 118, which includes an oxidizing catalyst, is coupled to an outlet 116b of the mixer unit 116. In the illustrative example shown in FIG. 2, the oxidizer unit 118 comprises a catalyst block having a predetermined size so as to form a cover over the outlet 116b of the mixer 116.

The mixer 116 includes an inlet assembly 120 which is coupled with the anode outlet 104b and with an air supply 121. The inlet assembly 120 includes an anode exhaust inlet 114a, which is coupled to the anode outlet 104b, for receiving anode exhaust from the fuel cell anode 104 and an air inlet 120b for receiving air from the air supply 121. Anode exhaust gas and air are combined in the inlet assembly 120 of the mixer 116, and are conveyed into a mixing zone 116a of the mixer 116 for further mixing.

As described above, the temperature of the anode exhaust entering the oxidizer assembly 114 is approximately 550-700° Celsius. After the hot anode exhaust gas is combined with cooler air in the inlet assembly 120 and further mixed in the mixing zone 116a of the mixer 116, the temperature of the mixture is approximately 300-400° Celsius. Electrolyte particles present in the anode exhaust solidify as the temperature of the anode exhaust and air mixture is lowered. While the anode exhaust and air mixture passes through the oxidizer unit 118, the solid electrolyte particulates are not able to pass through passages in the oxidizer unit 118 and therefore deposit on the face 118a of the oxidizer 118. With continued operation of the oxidizer assembly 114, electrolyte particulates accumulate on the face 118a of the oxidizer unit 118 and form a partial barrier in the pathway of the gas mixture to and through the oxidizer unit 118. This partial blocking on the oxidizer unit face 118a causes an increase in the pressure of the gas in the mixer 116. At the same time, the pressure of the oxidizing gas leaving the oxidizing assembly 114 drops, increasing the pressure difference across the oxidizer unit 118.

In accordance with the principles of the present invention, the oxidizer assembly 114 and fuel cell system 100 are adapted to perform in-situ removal of electrolyte particulates from the oxidizer unit 118. Various embodiments of the oxidizer assembly and system 100 so adapted are described below.

In-situ Removal of Electrolyte Deposits Using Water

In accord with a first one embodiment of the invention, electrolyte particulate deposits are removed from the oxidizer unit 118 by adapting the oxidizer assembly 114 and the fuel cell system 100 so that the oxidizer unit 118 is exposed to a water solvent without removing the oxidizer unit 118 from the assembly 114 and without removing the assembly 114 from the fuel cell system 100. In particular, the assembly 114 and the system 100 are adapted or conditioned so that the oxidizer assembly 114 is supplied and able to receive a sufficient amount of water to contact and preferably immerse the face 118a of the oxidizer unit 118 for a predetermined period of time. The system 100 is also adapted, during the water treatment, to be in a deep thermocycle stage or state in which the temperature is decreased to ambient temperature, so that no power is being produced by the system.

Figure 3:
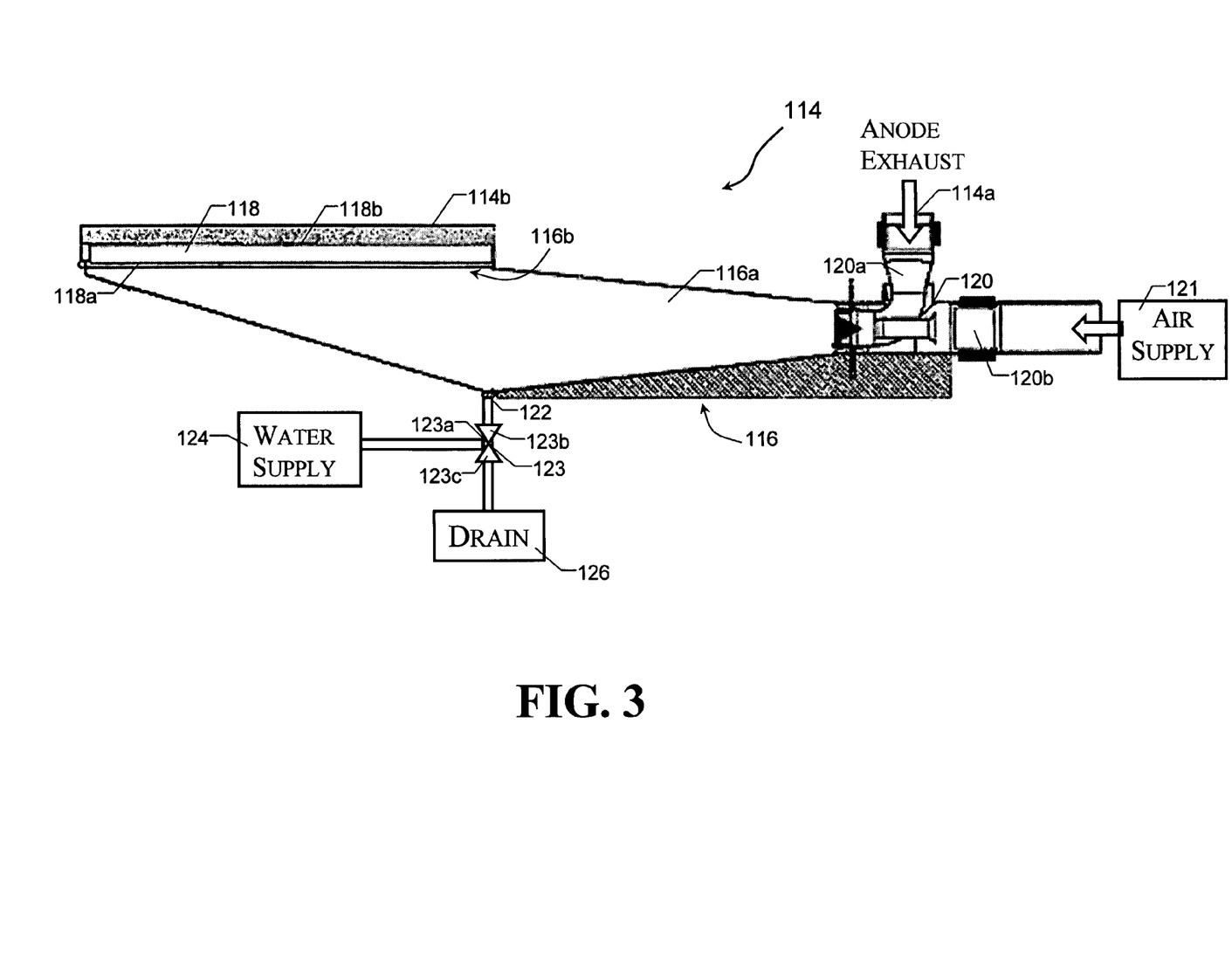
FIG. 3 shows a first embodiment of the assembly of FIG. 2 adapted for in-situ removal of electrolyte particulates using a water solvent.

More particularly, FIG. 3 shows the assembly 114 of FIG. 2 and the system 100 so adapted or conditioned. As shown, an inlet/outlet opening 122 is provided in the mixing zone 116a of the mixer 116, this inlet/outlet opening 122 being coupled to a water supply 124 and to a drain 126 provided in the system 100. A valve 123, such as a three-way valve, is also added to the system 100 to control the passing of water through the inlet/outlet opening 122 to and from the mixer 116, and to maintain the inlet/outlet opening 122 in a closed state during the operation of the fuel cell system 100.

When the fuel cell system is in the deep thermocycle stage and removal of electrolyte is initiated, an inlet portion 123a and a portion 123b of the valve 123 are opened to allow water from the water supply 124 to flow through the inlet/outlet opening 122 into the mixing zone 116a of the mixer 116, while the outlet portion 123c of the valve 123 remains closed. Water is allowed to flow into the mixer 116 and to fill the mixing zone 116a until the oxidizer unit 118 is exposed to water and, in particular, until at least the face 118a of the unit 118 is submerged in water.

When the amount of water in the mixer 116 reaches a predetermined level, the valve portions 123a and 123b are closed. The face 118a of the oxidizer unit 118 remains submerged in water for a predetermined period of time, i.e. approximately 30 minutes to 2 hours. After expiration of the predetermined period of time, water and electrolyte particulate deposits dissolved from the face 118a are removed from the mixer 116 and are passed into the drain 126 through the inlet/outlet opening 122 by opening the valve portions 123b and 123c. The valve portion 123a remains closed while water and dissolved electrolyte deposits are being removed from the mixing zone 116a. In addition, a nozzle coupled to the inlet/outlet opening 122 may be provided to assist in the removal of water and dissolved electrolyte from the mixing zone 116a.

In the illustrative embodiment of FIG. 3, the oxidizer assembly 118 is configured so that the opening 122 is provided in the lower portion of the mixing zone 116b, and the same opening 122 is used for supplying and removing water to and from the mixer 116. As can be appreciated, the oxidizer assembly can be configured in other ways so as to convey water from the water supply 124 to the mixer unit 116 to immerse the face 118a of the oxidizer unit and to drain the water and dissolved electrolyte particulates from the mixer unit.

Figure 4:
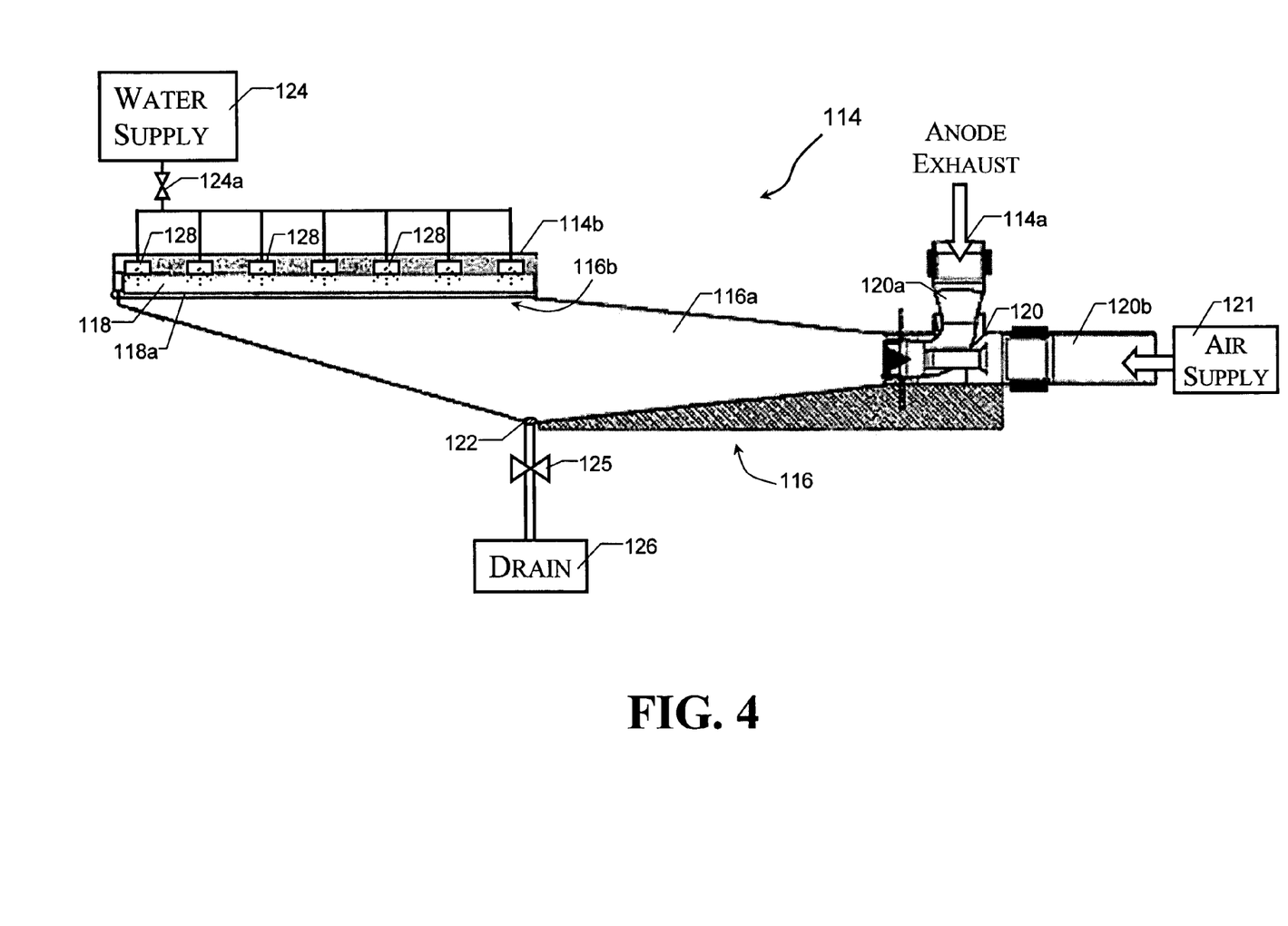
FIG. 4 shows a modified form of the assembly of FIG. 3.

For example, as shown in FIG. 4, the oxidizer assembly 114 may be modified to include one or more water delivery units 128, such as sprinklers, near the outlet face 118b of the oxidizer unit 118. In this illustrative arrangement, water is supplied to each of the water delivery units 128 from the water supply 124, and allowed to flow from the delivery units 128 through the pores or channels in the oxidizer unit 118 into the mixing zone 116a of the mixer 116. A valve 124a is provided between the water supply 124 and the water delivery units 128 to control the supply of water to the units. During the deep thermocycle stage or mode of the system 100, the valve 124a is opened to initiate electrolyte particulate deposit removal by allowing water to be conveyed from the water supply 124 to the delivery units 128.

As in the illustrative arrangement shown in FIG. 3, water is allowed to fill the mixing zone 116a of the mixer 116 and to at least submerge the face 118a of the oxidizer unit 118. When a predetermined amount of water is supplied to the mixing zone 116a, the valve 124a is closed and remains in a closed state until the next initiation of the electrolyte removal. The face 118a of the oxidizer unit 118 is submerged in water for a predetermined period of time sufficient to dissolve the electrolyte particulate deposits on the face. In the present illustrative example, the predetermined period of time is approximately 30 minutes to 2 hours.

After the expiration of the predetermined period of time, all or most of the electrolyte particulate deposits are removed from the oxidizer unit 118 by dissolving in water. The mixture of water and electrolyte is then removed from the mixing zone 116a through an opening 122 provided in the mixing zone 116a. In the present illustrative embodiment, the opening 122 is provided at the bottom portion of the mixing zone 116a of the mixer 116 and is coupled to the drain 126. In addition, a nozzle (not shown) may be coupled to the drain opening 122 to further assist with the removal of water from the mixer 116. A valve 125 is provided between the opening 122 and the drain 126 for controlling removal of water from the mixer 116. Particularly, the valve 125 is opened after the expiration of the predetermined period to allow water to pass from the mixing zone 116a through the opening 122 and into the drain 126. As can be appreciated, the valve 125 is closed during the operation of the fuel cell system, when the valve 124a is open and water is being supplied from the delivery units 128 into the mixing zone 116a, and during the predetermined period of time when the catalyst is submerged in water.

Removal of potassium carbonate electrolyte particulate from the surface of the oxidizer catalyst using water was tested on samples of oxidizing catalyst exposed to potassium carbonate solution. In preparing catalyst samples for such testing, samples of oxidizing catalyst were dipped into a solution containing 20 wt % potassium carbonate to coat each of the samples with sufficient potassium carbonate. Each sample included approximately 1-4 wt % of potassium carbonate. The samples were then dried overnight at 110° Celsius. The coated samples were submerged in water for approximately 30 minutes. The volume of water used for each sample was approximately 5 times the volume of each sample. Subsequent testing of the washed samples indicated that all surface electrolyte coating was removed. As a result, the pressure drop across the sample was reduced and the activity of the catalyst was restored.

In a second embodiment of the invention in which water is used as the solvent to remove electrolyte particulate deposits from the oxidizer unit 118, the oxidizer unit 118 and the system 100 are adapted or conditioned to pass a humidified gas at a predetermined temperature through the unit 118. A gas comprising air and water vapor is suitable for use as the humidified gas. In this case, the fuel cell system 100 is adapted to be at hot standby conditions or at low temperatures (about 500° F.) with no power generation mode during the removal of the electrolyte deposits.

Figure 5:
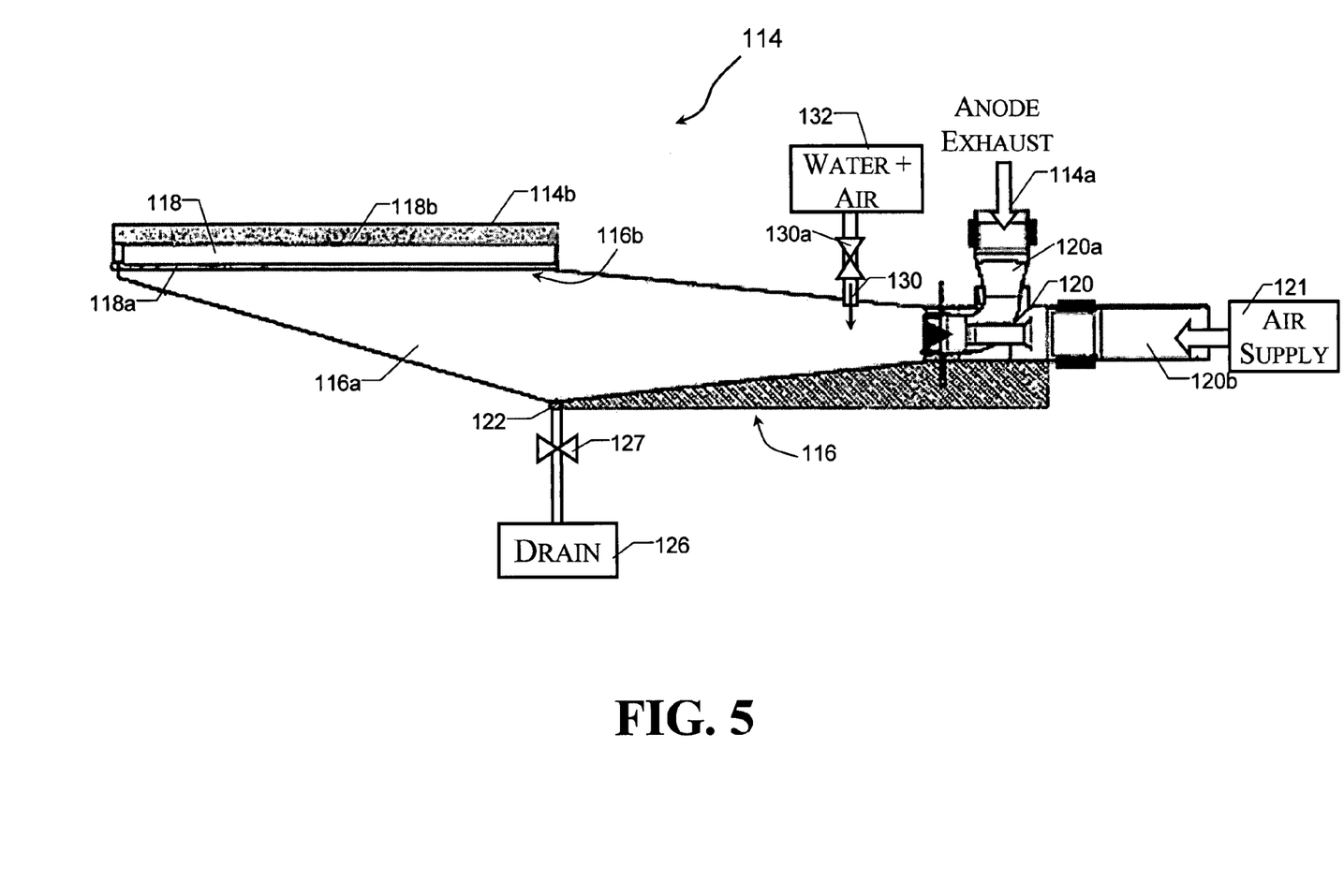
FIG. 5 shows a second embodiment of the assembly of FIG. 2 adapted for in-situ removal of electrolyte particulates using humidified gas as the solvent.

More particularly, FIG. 5 shows the oxidizer assembly 114 of FIG. 2 modified to provide an inlet opening 130 in the mixer 116 coupled to a humidified gas supply 132. In this case, with the system 100 shutdown, humidified gas is supplied from the humidified gas supply 132 to the mixer 116 through the opening 130 by opening a valve 130a which controls the delivery of humidified gas to the assembly 114. Particularly, the valve 130a is opened when the removal of electrolyte deposits is initiated and the humidified gas is allowed to pass into the mixing zone 116a. The humidified gas flows from the mixing zone 116a through the oxidizer unit 118 for a pre-determined period of time. The predetermined period of time is between 30 minutes and 4 hours.

The temperature of the humidified gas supplied to the mixing zone 116a is controlled to be lower than the temperature of the catalyst block in the oxidizer unit 118. Particularly, the temperature of the humidified gas is approximately 55° Celsius, while the temperature of the oxidizer unit 118 is maintained at approximately 90° Celsius. Because the temperature of the oxidizer unit 118 is higher than the temperature of the humidified gas, water drops are formed on the surface of the face 118a of the unit as gas passes therethrough, wetting the electrolyte particulate deposits. As a result, the electrolyte dissolves in these water drops.

The dissolved electrolyte falls into the mixing zone 116a of the mixer 116. Referring again to FIG. 5, an outlet opening 122 is provided at the bottom portion of the mixing zone 116a, the opening 122 being coupled to a drain 126. A valve 127 is provided for controlling the removal of water and electrolyte mixture from the mixing zone 116a. The valve 127 is opened after a predetermined period of time expires and the electrolyte deposits dissolved in the water are removed. As can be appreciated, the valve 128 is closed during all other times.

In an alternative of the embodiment of FIG. 5, instead of supplying humidified gas to the mixer unit 116, the humidified gas supply is coupled to and through the oxidizer unit 118 via supply to the outlet of the unit. In this arrangement, humidified gas passes through the oxidizer unit and into the mixing zone. As previously discussed, this results in water droplets forming on the face 118a of the oxidizing unit 118 which dissolve the electrolyte particulates thereon. The resultant dissolved electrolyte is then removed from the mixing zone via opening of the valve 127 for disposal through the drain 126.

Tests on electrolyte coated samples of oxidizing catalyst using the above-described arrangement of FIG. 5 showed that more than 90% of the electrolyte can be removed from the surface of the oxidizer unit 118. As discussed above, such removal significantly reduces the pressure difference between the anode exhaust gas and the cathode inlet gas and improves the catalyst's performance.

In-situ Combustion of Electrolyte Deposits

In accordance with a third embodiment of the invention, the system 100 and oxidizer assembly 114 are adapted so that removing of electrolyte particulate deposits from the surface 118a of the oxidizer unit 118 is realized by combustion or heating. In this case, the fuel cell system 100 is adapted to be placed in a hot standby pre-ignition mode or state and no power is being produced by the system.

More particularly, the system 100 is operated in a hot standby pre-ignition mode to increase the temperature within the oxidizer assembly 114 to cause flaking and vaporization of the electrolyte particulate deposits on the oxidizer unit 118 without affecting the performance of the oxidizer catalyst. Particularly, the temperature is increased to approximately 790 to 840° Celsius. The desired temperature target will be achieved by adjusting the air and fuel ratio to favor combustion, resulting in higher temperatures at the surface of the catalyst. In this case, the maximum desired temperature during hot standby pre-ignition is 800° Celsius so as to prevent deactivation of the oxidation catalyst. When the temperature of the assembly 114 reaches approximately 790° Celsius, the electrolyte particulate deposits on the surface of the oxidizer unit 118 begin to flake off from the surface 118a. This is believed to be caused by the loss of adhesive characteristics of the electrolyte particulates at elevated temperatures as well as by a thermal expansion mismatch during the cooling of the assembly 114. The flakes fall into the mixing zone 116a where they impinge on the surfaces of the mixer 116.

In a test to simulate this in-situ removal configuration, oxidizer catalyst samples with electrolyte deposits thereon were utilized. Coated samples for these tests were prepared using the same procedures as described herein above. For these tests, only one surface of each sample was coated with electrolyte. Each of the samples was inverted so that the electrolyte coated surface formed a bottom surface of the sample similar to the position of the catalyst block in the oxidizer unit 118 of the assembly 100 of FIG. 2. The samples were heated in air to 790° Celsius or to 840° Celsius for approximately 2 hours to 4 hours. Approximately 60% of the electrolyte deposits flaked off from the samples heated to 790° Celsius and 89% of the electrolyte deposits likewise flaked off from the samples heated to 840° Celsius.

Figure 6:
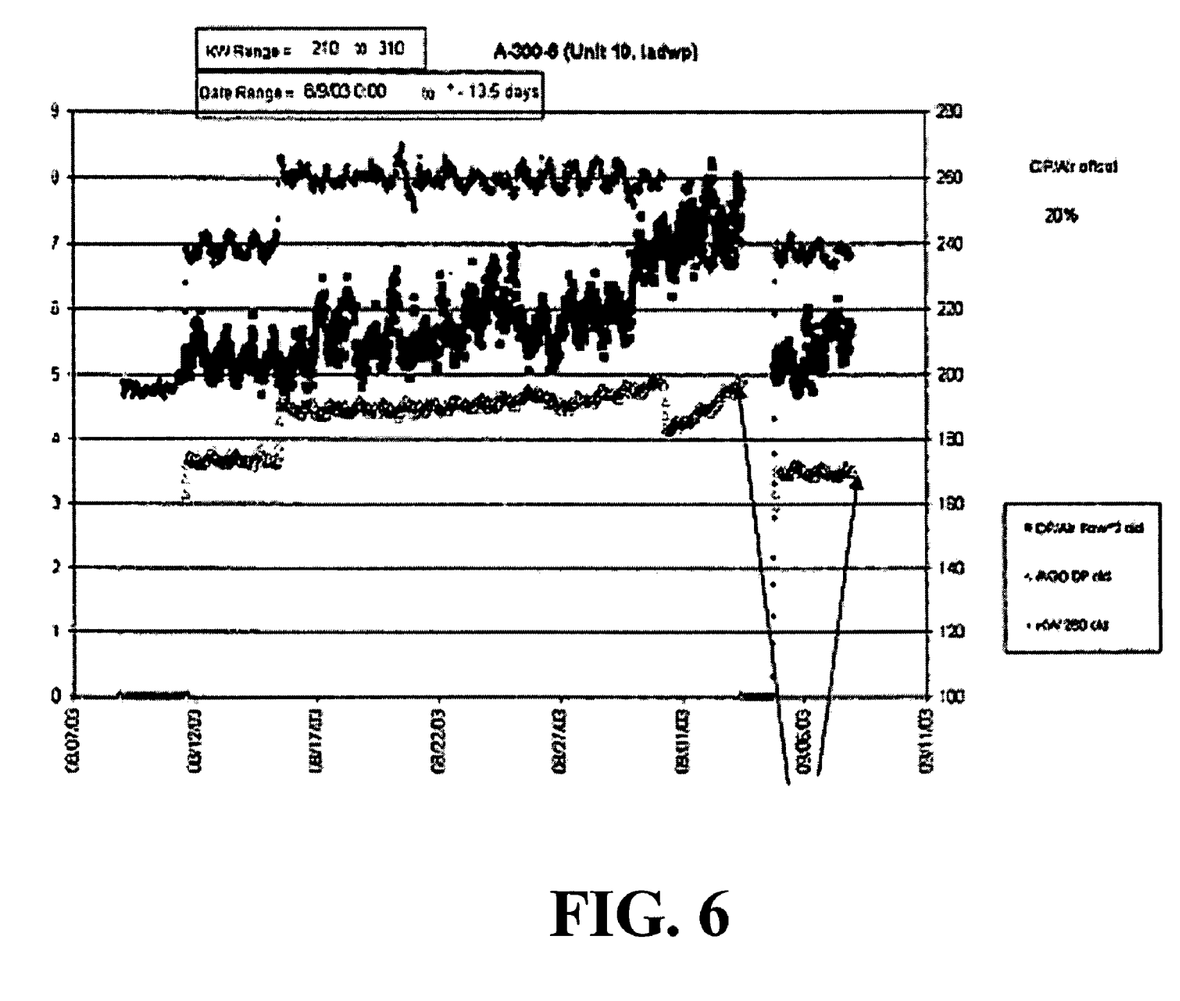
FIG. 6 shows a graph of the performance of the fuel cell system before and after removal of electrolyte particulates using a third embodiment of the oxidizer assembly of FIG. 2 adapted to remove electrolyte particulates by combustion.

FIG. 6 shows a performance graph of the fuel cell system before and after the removal of the electrolyte particulate deposits with the fuel cell system 100 and oxidizer assembly 114 adapted for removal by combustion or heating. As shown, the X-axis represents the operation time of the fuel cell system, while the Y-axis represents the pressure difference between the pressure of the gas in mixing zone 116a of the mixer unit 116 and the pressure of the oxidizing gas at the cathode inlet. As can be seen, the pressure difference increases as the operation time of the fuel cell increases. The increase in the pressure difference is due to increase in the pressure of the gas in the mixing zone and a simultaneous decrease in the pressure of the gas at the cathode inlet. Particularly, the amount of gas passing through the oxidizing catalyst is reduced due to the accumulation of electrolyte deposits on the inlet face of the catalyst.

As also shown in FIG. 6, the pressure difference sharply decreased after the electrolyte particulates were removed from the face of the oxidizer catalyst on Sep. 5, 2003 using the combustion adaptation of the system and oxidizer assembly. It can therefore be seen that the present invention restores the pressure distribution between the anode exhaust and the cathode inlet and maintains the stability in the operation of the fuel cell system.

In-Situ Filtration of Electrolyte Deposits

Figure 7:
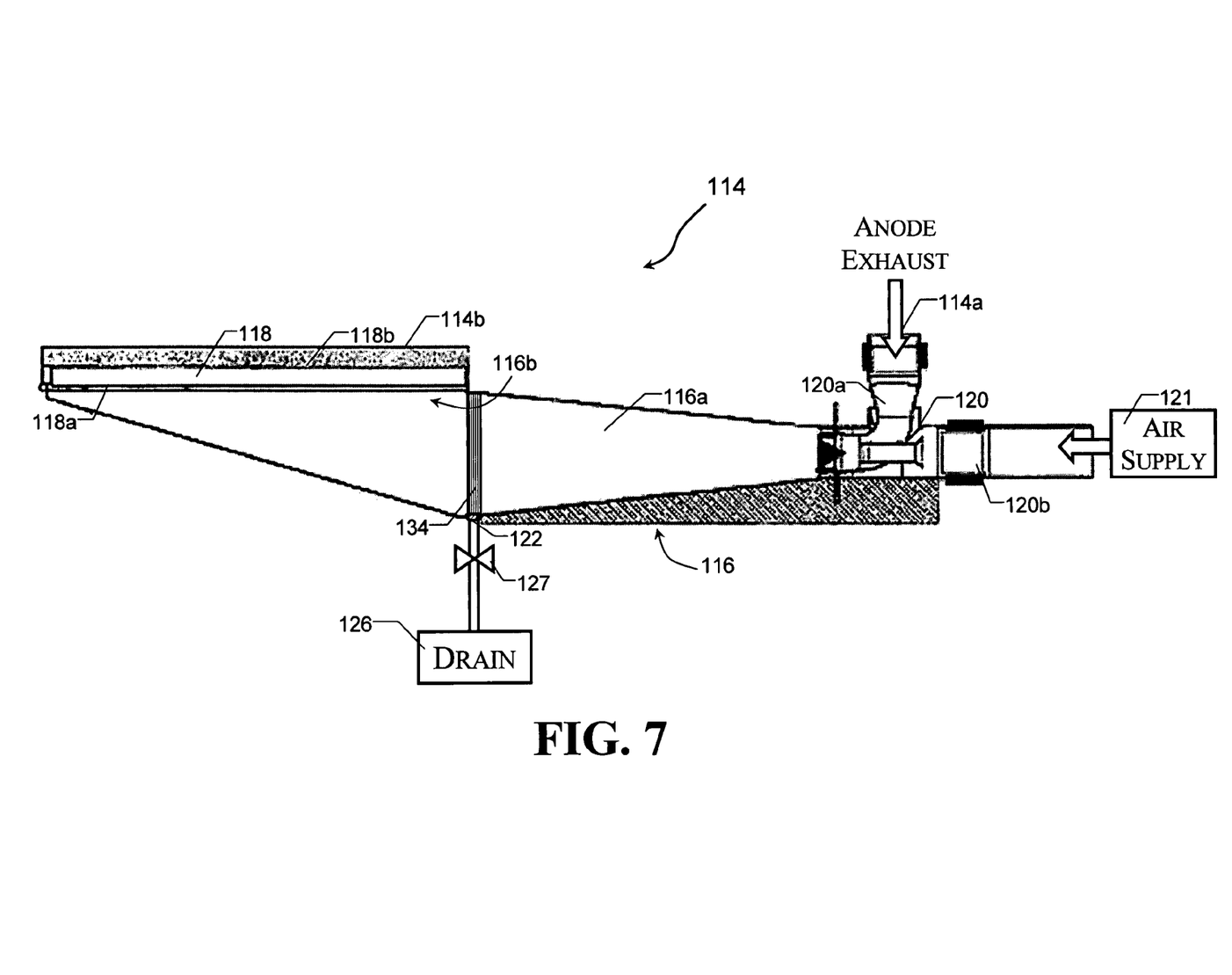
FIG. 7 shows a fourth embodiment of the oxidizer assembly of FIG. 2 adapted for in-situ removal of electrolyte particulates using a filter.

In accordance with a fourth embodiment of the invention, the system 100 and oxidizer assembly 114 are adapted or conditioned to remove electrolyte particulates in the anode exhaust and air mixture by entrapping the electrolyte particulates. More particularly, as shown in FIG. 7, a filter, depicted as a vane filter 134, is positioned within the mixing zone 116a of the mixer unit 116 of the assembly 114 to remove electrolyte particulates in the gas mixture passing therethrough. The filter 134 thus continuously removes electrolyte particulates, while the system 100 remains in operation with the oxidizer unit retained in the assembly 114 and the assembly 100 retained in the system 100.

As shown in FIG. 7, the vane filter 134 is positioned in the mixing zone 116a so that the gas mixture is required to pass through the filter 134 before reaching the oxidizer unit 118. In this case, the vane filter 134 is perpendicular to the direction of the gas flow to allow direct impingement of the electrolyte particulates on the surface of the filter. The electrolyte particulates are removed from the gas mixture by depositing on the surface of the filter 134 while the remainder of the gas mixture passes through the filter to the oxidizer unit 118.

In the case shown, a lower portion of the filter 134 is aligned with the lowest point of the mixing zone 116a of the mixer. However, it is understood that the position of the filter 134 within the mixing zone 116a may vary so long as the gas passing through the zone 116a is conveyed through the filter 134 prior to reaching the oxidizer unit 118.

In the arrangement shown in FIG. 7, the electrolyte particulates deposited on the filter surface fall to the lower portion of the filter due to gravitational force. These particulates will accumulate in the lower portion of the filter 134 until they are removed. Accumulated particulates can be removed periodically. In this illustrative arrangement, an opening 122 coupled with a drain 126 is provided in the mixing zone 116a directly beneath the filter 134. A valve 127 controls the removal of accumulated electrolyte particulates by opening and closing the opening 122. In particular, when accumulated electrolyte particulates need to be removed from the filter 134, the valve 127 is opened and the particulates are allowed to fall through the opening 122 into the drain 134 due to the gravitation force. The removal of particulates through the opening 122 is performed periodically during a maintenance schedule and the assembly 100 is cooled down to ambient conditions during this operation.

Figure 8:
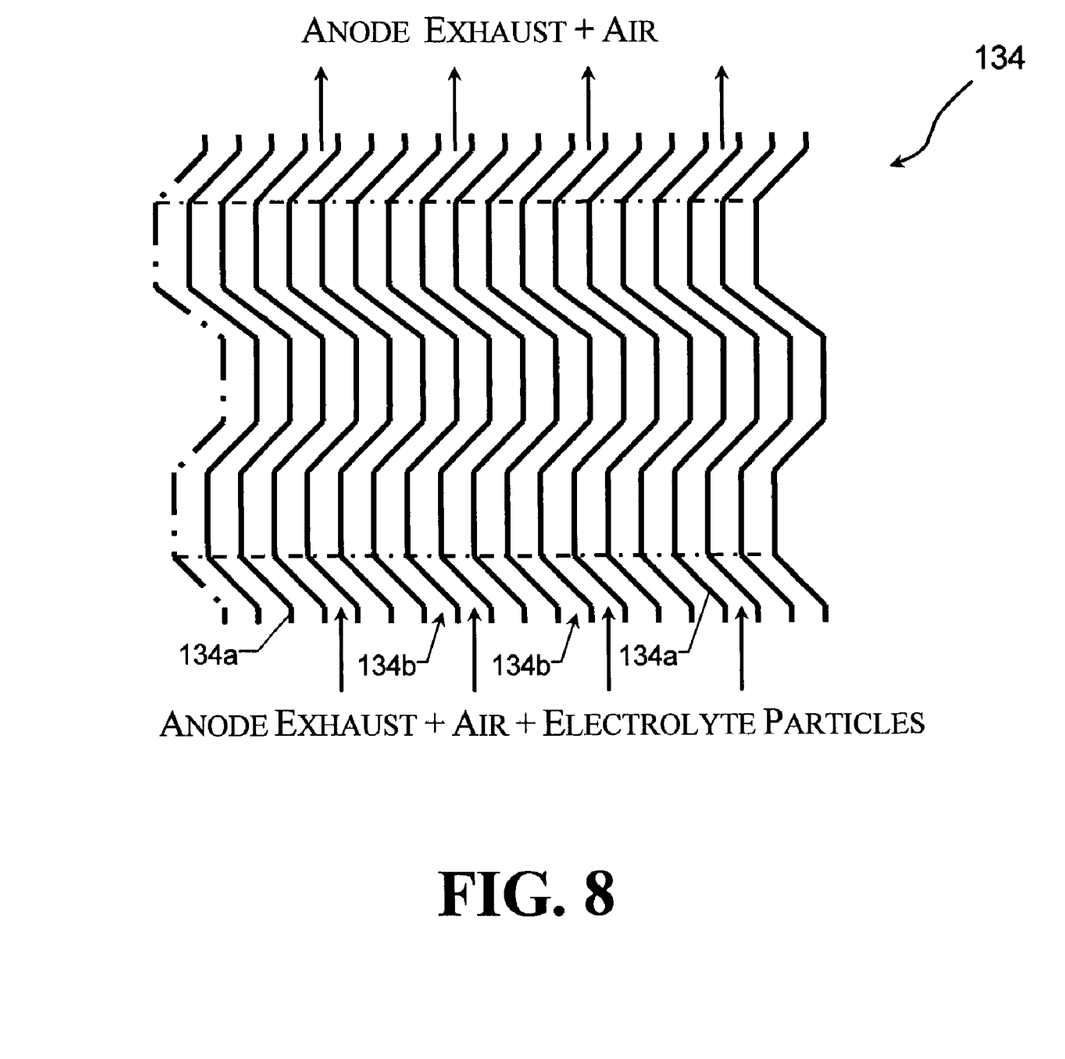
FIG. 8 shows a cross-section of a vane filter of the oxidizer assembly of FIG. 7.

FIG. 8 shows a detailed a cross sectional view of the vane filter 134. As shown, the vane filter has a plurality of plates 134a which are parallel to one another and form a plurality of passages 134b to guide the gas mixture therethrough. The plates 134a have a preselected configuration so as to achieve maximum contact between the gas mixture and the plate surfaces. This exposes a greater amount of the gas mixture to the filter surface which increases the amount of electrolyte particulates being deposited on the filter plates.

In the illustrative form of FIG. 8, the vane filter 134 includes a plurality of spaced corrugated plates 134a such that the gas mixture flowing through the filter is directed to flow through the spaces between the plates. Using this arrangement, the direction of the gas flowing along the passages 134b in the filter is changed a number of times, resulting in greater mixing of the gas in the filter passages and in optimal contact between the gas mixture and the plate surfaces.

The dimensions of the filter 134 can be varied depending on the size of the mixer 116, the amount of gas passing through the oxidizer assembly 114, electrolyte particle concentrations in the gas mixture, the velocity of the gas mixture flowing through the mixer 116 and other factors. In the case shown, the velocity of the gas mixture is approximately 10 to 20 feet/sec (at varied power generation conditions), which requires the filter 134 to be at least 4 inches in thickness for efficient electrolyte particulate removal. In addition, the width of the passages 134b formed by the parallel plates 134a of the filter 134 should be sufficient so as to allow efficient particulate removal without affecting the pressure in the mixing zone. Particularly, in the present case, the passages 134b are approximately 0.25-0.5 inches wide.

As can be appreciated, the arrangement of the filter 134 and the filter plates 134a within the filter 134 may be varied so as to optimize the flow of the gas mixture through the filter and the deposition rate of the electrolyte particulates on the filter surface.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention, as defined by the accompanying claims.

What is claimed is:

1. A method for use with an oxidizer assembly of a fuel cell system, the oxidizer assembly having an oxidizer unit for oxidizing anode exhaust gas containing electrolyte particulates in the oxidizer assembly, the method comprising:
   conditioning the oxidizer assembly so as to enable the electrolyte particulates to be removable from the oxidizer assembly, said conditioning includes said oxidizer assembly receiving a solvent for contacting said oxidizer unit so that the electrolyte particulates thereon are removable therefrom;
   and removing the electrolyte particulates, said removing includes draining said solvent and said removed electrolyte particulates from said oxidizer assembly; and
   adapting said fuel cell system so as to allow said conditioning and removing to occur with said oxidizer assembly retained in said fuel cell system;
   wherein said conditioning and removing occur with the oxidizing unit retained in said oxidizer assembly and with said oxidizer assembly retained in said fuel cell system;
   wherein said solvent is introduced in one of a liquid or vapor form;
   wherein said oxidizer assembly includes a mixer unit connected to and feeding the input of said oxidizer unit, said mixer unit receiving and mixing an oxidant gas and said anode exhaust gas and feeding said mixed gas to said input of said oxidizer unit, and wherein:
   said receiving of said solvent is through one of an opening in said mixer unit and an output of said oxidizer unit;
   said draining is through an opening in said mixer unit;
   and said adapting of said fuel cell system includes providing and operating a solvent supply, a valve assembly and drain so as to enable carrying out of said receiving and draining.

2. A method in accordance with claim 1, wherein:
   said receiving is through said output of said oxidizer unit;
   and said adapting of said fuel cell system includes providing a sprinkler attached to said solvent supply so as to enable said receiving.

3. A method in accordance with claim 1, wherein:
   said electrolyte particulates comprise carbonate;
   said solvent is liquid water;
   said contacting occurs for a period of time in the range of 20 to 120 minutes;
   and said adapting of said fuel cell system comprises operating said fuel cell system in a deep thermocycle mode.

4. A method in accordance with claim 1, wherein:
   said electrolyte particles comprise carbonate;
   said solvent contains humidified gas;
   said contacting occurs for a period of time in the range from 30 minutes to 240 minutes;
   and said adapting of said fuel cell system comprises operating said fuel cell system at low temperature.

5. A method in accordance with claim 4, wherein:
   said humidified gas is at a temperature of about 55 degrees Celsius;
   and said oxidizer assembly is at a temperature of about 90 degrees Celsius.

* * * * *